(12) United States Patent
Illsley et al.

(10) Patent No.: US 9,598,599 B2
(45) Date of Patent: Mar. 21, 2017

(54) GAS BARRIER COATINGS

(75) Inventors: Derek Ronald Illsley, Kent (GB); Graham Trevor Street, Bromley (GB)

(73) Assignee: SUN CHEMICAL, B.V., Weesp (NL)

( * ) Notice: Subject to any disclaimer, the term of this patent is extended or adjusted under 35 U.S.C. 154(b) by 293 days.

(21) Appl. No.: 12/991,826

(22) PCT Filed: May 19, 2009

(86) PCT No.: PCT/GB2009/001255
§ 371 (c)(1),
(2), (4) Date: Nov. 9, 2010

(87) PCT Pub. No.: WO2009/141605
PCT Pub. Date: Nov. 26, 2009

(65) Prior Publication Data
US 2011/0049146 A1 Mar. 3, 2011

(30) Foreign Application Priority Data
May 19, 2008 (GB) .................................. 0809063.1

(51) Int. Cl.
| | | |
|---|---|---|
| *B32B 1/02* | (2006.01) | |
| *B32B 27/00* | (2006.01) | |
| *B05D 3/02* | (2006.01) | |
| *C08L 29/04* | (2006.01) | |
| *B65D 21/02* | (2006.01) | |
| *C08K 3/34* | (2006.01) | |
| *C09D 143/04* | (2006.01) | |
| *C09D 129/04* | (2006.01) | |
| *B32B 7/12* | (2006.01) | |
| *B32B 23/04* | (2006.01) | |
| *B32B 27/06* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 29/00* | (2006.01) | |
| *C08K 3/36* | (2006.01) | |

(52) U.S. Cl.
CPC .............. *C09D 143/04* (2013.01); *B32B 7/12* (2013.01); *B32B 23/04* (2013.01); *B32B 27/06* (2013.01); *B32B 27/281* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 29/002* (2013.01); *C09D 129/04* (2013.01); *B32B 2250/24* (2013.01); *B32B 2255/10* (2013.01); *B32B 2255/12* (2013.01); *B32B 2255/20* (2013.01); *B32B 2255/26* (2013.01); *B32B 2264/102* (2013.01); *B32B 2307/546* (2013.01); *B32B 2307/718* (2013.01); *B32B 2307/7244* (2013.01); *B32B 2307/7246* (2013.01); *B32B 2439/46* (2013.01); *B32B 2439/70* (2013.01); *B32B 2439/80* (2013.01); *C08K 3/36* (2013.01); *C08K 2201/008* (2013.01); *Y10T 428/1383* (2015.01)

(58) Field of Classification Search
CPC ...... B32B 27/08; C09D 129/04; C09D 143/04
USPC ......................................... 524/492, 493, 557
See application file for complete search history.

(56) References Cited

U.S. PATENT DOCUMENTS

| | | | |
|---|---|---|---|
| 3,241,990 A | 3/1966 | Harrison | |
| 3,285,859 A | 11/1966 | Jelen | |
| 3,914,518 A | 10/1975 | Haskell | |
| 4,539,133 A | 9/1985 | Boskamp | |
| 6,326,454 B1 * | 12/2001 | Shimizu et al. | ............. 528/153 |
| 6,599,622 B1 | 7/2003 | Chu et al. | |
| 7,135,429 B2 | 11/2006 | Raman et al. | |
| 2004/0054069 A1 | 3/2004 | Kusudou et al. | |
| 2006/0135676 A1 * | 6/2006 | Greenwood et al. | ......... 524/492 |
| 2007/0134507 A1 | 6/2007 | Yamasaki et al. | |
| 2008/0269397 A1 * | 10/2008 | Fichtner et al. | ............. 524/503 |
| 2010/0062117 A1 | 3/2010 | Illsley et al. | |

FOREIGN PATENT DOCUMENTS

| | | | |
|---|---|---|---|
| EP | 0123927 A2 | 11/1984 | |
| EP | 0590263 A2 | 4/1994 | |
| GB | 2431660 A | 5/2007 | |
| JP | 2000290580 A | 10/2000 | |
| JP | 2002/080832 | 3/2002 | |
| JP | 2002080832 A * | 3/2002 | ............... C09K 3/18 |
| JP | 2002-307599 A | 10/2002 | |
| JP | 2002-308617 A | 10/2002 | |
| JP | 2002-347837 A | 12/2002 | |
| JP | 2004018649 A | 1/2004 | |
| JP | 2004-217766 A | 8/2004 | |
| JP | 2004/359881 | 12/2004 | |

(Continued)

OTHER PUBLICATIONS

International Search Report, mailed Aug. 14, 2009.
Database WPI, Week 200427, Thomson Scientific, London, GB; AN 2004-286747, XP002539963, & JP 2004 018649 A (Unitika Ltd.) Jan. 22, 2004.
Database Caplus [Online], Chemical Abstracts Service, Columbus, Ohio, US; XP002539962, Accession No. 2008:1532036, Database Accession No. 150:57516.

(Continued)

*Primary Examiner* — Vu A Nguyen
(74) *Attorney, Agent, or Firm* — Charles C. Achkar; Ostrolenk Faber LLP.

(57) ABSTRACT

The use of a colloidal silica having a specific surface area greater than 300 m²/g in a gas barrier coating additionally comprising polyvinyl alcohol and/or ethylene vinyl alcohol copolymer and/or a silylated derivative thereof improves wet bond strength.

17 Claims, No Drawings

(56) References Cited

FOREIGN PATENT DOCUMENTS

| | | | |
|---|---|---|---|
| JP | 2005194471 A | 7/2005 | |
| JP | 2005194600 A | 7/2005 | |
| JP | 2006-116733 A | 5/2006 | |
| JP | 2006/175780 | 7/2006 | |
| JP | 2006-187966 A | 7/2006 | |
| JP | 2006-321192 A | 11/2006 | |
| JP | 2006-321194 A | 11/2006 | |
| JP | 2006-321198 A | 11/2006 | |
| JP | 2007-290312 A | 11/2007 | |
| JP | 2008307758 A | 12/2008 | |
| WO | WO-2005-037898 A1 | 4/2005 | |
| WO | WO2006065196 * | 6/2006 | ............... C08J 5/02 |
| WO | WO-2006065196 A1 | 6/2006 | |
| WO | WO2007049147 A1 | 5/2007 | |

OTHER PUBLICATIONS

Japanese Office Action Application No. 2011-510041 dated Jul. 9, 2013 (English translation).
EP Communication Application No. 09750083.9-1304, dated Jun. 24, 2013.
Japanese Office Action for Japanese application No. 2014-080252, dated Jan. 20, 2015.
Japanese Office Action issued in Japanese Application No. 2014-080252, dated Nov. 24, 2015 (with English Language Translation).

* cited by examiner

GAS BARRIER COATINGS

The present invention relates to gas barrier coatings, particularly having the ability to block the passage of oxygen, and which may be used to coat and impart gas barrier properties to a variety of materials, notably packaging for foods and drinks, especially liquids, where exposure to oxygen needs to be eliminated or restricted.

Synthetic plastics materials have long been used for the packaging of foods and other materials. However, in recent years, it has become appreciated that, in addition, many foods and other sensitive materials benefit from being protected from atmospheric oxygen. A wide variety of multi-layer laminate structures has been developed to provide barrier properties and other performance characteristics suited to a pack's purpose. These laminates may be any combination of plastic, metal or cellulosic substrates, and may include one or more coating or adhesive layers. Laminates which include polymeric films having metals or inorganic compounds, such as silicon oxides, deposited thereon have been found to give good general barrier properties and are widely used. However, they may lose their ability to prevent the ingress of oxygen altogether at high temperatures, for example when the packaged material is retorted in order to sterilise and/or cook it. Moreover, the inorganic layer of these types of laminate is rather brittle and may crack or break when the laminate is flexed, resulting in a loss of the gas barrier properties.

More recently, gas barrier coatings comprising dispersed clay, especially nanoparticles, and a hydrophilic polymer, such as polyvinyl alcohol (PVOH) or ethylene-vinyl alcohol copolymer (EVOH), have been used, as described, for example, in U.S. Pat. No. 6,599,622 or EP 0 590 263. Where these are used as a surface coating, as is described in this prior art, there are no problems. However, we have found that, for many purposes, it is desirable that the coating should have a covering as well as a substrate, and, if the gas barrier coating is to be sandwiched between two films of a laminate in this way, then the bond strength between the films, e.g. of polyethylene (PE) and the coating becomes an issue.

Using such technologies, we have achieved excellent bond strengths; in many cases greater than 3.0N/15 mm. However, we have also found that, where such a laminate is exposed to aqueous fluids, e.g. when the laminates were immersed in water, the bond strength at the coating-PE interface was observed to fall off very quickly, reaching values of less than 0.5N/15 mm in less than 3 hours of immersion.

Therefore, there is a need to provide coatings that not only improve the oxygen barrier performance of the final laminate structures but also allow the laminates to maintain good levels of bond strength upon immersion in water. Maintaining bond strengths after immersion is required to provide laminate integrity resulting from spills during filling or other instances of contact with aqueous fluids.

Several attempts have been made to achieve both gas barrier properties and good wet bond strength, for example JP2007290312A2, JP2006321198A2, JP2006321194A2, JP2006321192A2, JP2006187966A2, JP2006116733A2, WO05037898A1, US20070134507A1, and JP2004217766A2.

A film for use in a bag-in-the-box is described in JP2002347837A2.

We have now found that a gas barrier coating having good wet bond strength may be achieved using a coating of the PVOH and/or EVOH type, but containing a specific type of colloidal silica.

Thus, in one embodiment, the present invention consists in a composition for preparing a gas barrier coating, said composition comprising an aqueous solution or dispersion of a polyvinyl alcohol (PVOH) and/or an ethylene-vinyl alcohol copolymer (EVOH) and/or a silylated derivative thereof and a colloidal silica (preferably a suspension thereof), in which said silica has a specific surface area greater than 300 m$^2$/g.

In an optional embodiment, the colloidal silica has a particle size less than 20 nm, preferably less than 10 nm.

Particle sizes herein are measured by acoustic particle sizing using a DT1200 instrument, available from Dispersion Technology Inc. Other measurement techniques may, however, also be used, provided that they give equivalent results.

Specific surface areas herein are measured by the well-known Sears technique of titration with sodium hydroxide [G. W. Sears Jr., *Anal. Chem.*, 28, 1981 (1956)]. Other measurement techniques may, however, also be used, provided that they give equivalent results.

In a further aspect, the present invention consists in a process for preparing a gas barrier film, comprising mixing a solution or dispersion of a PVOH and/or EVOH and/or a silylated derivative thereof with a colloidal silica (preferably a suspension thereof), and then carrying out the steps:

1. coating a first flexible polymer film with the resulting mixture;
2. applying an adhesive coating to either or both of the coated side of the first film or to a second flexible polymer film;
3. adhering the first and second films together; and
4. if desired, subsequent plastic films may be laminated to the first or second films to create multi layer structures The surface of the first polymer film which is coated with the gas barrier coating of the present invention is first coated with either a metal or metal oxide layer typically used in packaging materials preferably a metal or metal oxide layer, e.g. of Al, AlOx SiOx or other inorganic oxides, which may be coated by any conventional method, e.g. by vacuum deposition.

There is no particular restriction on the nature of the PVOH or EVOH used in the present invention, provided that it can form a solution or dispersion in an aqueous medium. Examples of such polymers are described in, for example, U.S. Pat. No. 6,599,622 or EP00590263B1, the disclosure of which is incorporated herein by reference. Commercial examples of such PVOH and silylated derivatives thereof include Mowiol range (Kurary) Celvo range (ex Celanese), and commercial examples of water soluble EVOH include Exceval Aqueous-4104 (ex Kurary) Eval F101 (ex Eval company of America).

As used herein, the term "silylated polyvinyl alcohol" means a polymer containing both vinyl alcohol units and silyl units. In addition, it may contain units derived from other monomers, for example: olefins, such as ethylene or propylene; acrylic or methacrylic acid esters, such as methyl acrylate or ethyl methacrylate; other vinyl monomers, such as vinyl acetate; or styrene or derivatives thereof, such as methylstyrene.

There is no particular restriction upon the nature of the silylated polyvinyl alcohol used in the present invention, other than that it should be appropriate to the intended use of the gas barrier coating, and it may be any polyvinyl alcohol having a silicon atom in the molecule. Such silylated polyvinyl alcohol may, for example, be prepared by: silylating a polyvinyl alcohol or a modified polyvinyl acetate which contains hydroxy and/or carboxy groups; saponifying a copolymer of a vinyl ester and an olefinically unsaturated monomer containing silyl groups; or saponifying a polyvinyl ester having a terminal silyl group(s), which may be obtained by polymerising a vinyl ester in the presence of a silyl mercaptan. More generally, they may be prepared as described in EP 0 123 927, JP2005194600A2, JP2005194471A2, JP2000290580A2, and US 2004/0054069. They may also be prepared by the copolymerisation of vinyl alcohol (or a precursor thereof) with a silyl group-containing monomer, such as vinyltrimethoxysilane. An example of a commercial silylated PVOH is Polyviol P-6060 (ex Wacker).

The nature of the colloidal silica is a key feature of the coating of the present invention: if the particle size is too great the bond strength of the cured laminate before and after water immersion is poor. In accordance with the present invention, we prefer that the mean particle size of the silica particles should be less than 15 nm, more preferably less than 12 nm and most preferably approximately 10 nm. The present invention does not require any lower limit on the particle size; but, in practice, the particle size will not be less than 2 nm. However, it is usual to specify colloidal silicas with respect to their specific surface area. For this invention, we have found that the specific area should be greater than 300 $m^2/g$, and even more preferred is the use of colloidal silicas with specific areas greater than 400 $m^2/g$, most preferably greater than 450 $m^2/g$. Again, the present invention does not require any upper limit on the specific surface area, but, in practice, the maximum surface area is likely to be 800 $m^2/g$.

The colloidal silica is preferably an anionic colloidal silica, for example Bindzil 15/500 (ex. EKA), LUDOX H540, LUDOX CL (ex Grace Davidson), Dispercoll S3030, Dispercoll 4020 (ex Bayer AG), Kostrosol 1030 Kostrol 1540 (ex Chemiewerk Bad Kostritz Gmbh), Levasil 300/30 or Levasil 500/30 (ex H.C Starck GmbH and Co). Of these, we prefer Bindzil 15/500, which has a specific area of 500 $m^2/g$, and a mean particle size of about 10 nm measured using the DT-1200. These commercially available products are suspensions of colloidal silica.

The ratio of the PVOH/EVOH to silica is important in order to achieve optimal wet bond strength. For this purpose, maintaining the ratio (w/w) of PVOH and/or EVOH to silica in the range of from 1:1 to 3:1, more preferably from 1.5:1 to 2.5:1 is desirable.

The solids content of these aqueous coatings can vary over a wide range and is not critical to the present invention. However, we prefer to apply the coating composition at a total solid content of from 2 to 20% (w/w), more preferably from 1.5 to 8.5% (w/w). In order to obtain sufficient barrier capacity, it is highly desirable to apply the coatings such that a minimum dry film weight of 0.10 gsm is achieved, more preferably at least 0.3 gsm, and most preferably at least 0.5 gsm.

We have also found that immersion bond strength can be further improved by including in the coating an alkali metal silicate, especially lithium silicate. The amount of the alkali metal silicate is preferably in the range of 2-25% (w/w), preferably 3-15% (w/w), and more preferably 5-9% (w/w), based on total solids content of the coating.

The coating composition is applied in the form of a solution or dispersion of the silica and the polymer in a suitable solvent. The solvent is preferably aqueous, and is more preferably water, optionally containing a small quantity of a miscible co-solvent, such as an alcohol (for example ethanol, n-propanol or isopropanol) or a ketone (such as acetone). Where a co-solvent is present, this can be up to 75% (w/w) of the total composition. However, it is preferred that the content of the co-solvent is less than 50%, more preferably less than 30% of the entire composition. The preferred co-solvent is an alcohol, preferably ethanol or isopropanol.

If desired, in addition to the PVOH and/or EVOH, other polymers or resins may be included in the coating composition, provided that these co-resins are themselves compatible in the final composition. Examples of such polymers and resins include solution acrylics, acrylic emulsions, polyesters, alkyds, sulphopolyesters, polyurethanes, vinyl acetate emulsions, poly(vinyl butyral), poly(vinyl pyrrolidone), poly(ethylene imine), polyamides, polysaccharides, proteins, epoxies, etc. It is also possible to include sol-gel precursors in these compositions, e.g. a hydrolysate of tetraethyl orthosilicate.

The coating composition of the present invention comprising the silica, the polymer solution or dispersion and a solvent therefor may be applied to a substrate by any conventional means. The solvent may then be removed, e.g. by heating, leaving a film comprising the silica dispersed through the polymer on the substrate. The resulting gas barrier film may then be adhered to a further flexible plastics sheet.

There is no particular restriction on the nature of the flexible substrate, although it is preferably a plastics film or plastic film, optionally precoated with Al, AlOx SiOx or other inorganic oxides, and any material suitable for the intended use may be employed. However, where the matter being packaged with the coating film of the present invention is a foodstuff or pharmaceutical, it will normally be preferred that the plastics film or other substrate should be food grade. Examples of suitable materials include: polyolefins, such as polyethylene or polypropylene; polyesters, such as polyethylene terephthalate, polybutylene terephthalate or polyethylene naphthenate; polyamides, such as nylon-6 or nylon-66; and other polymers, such as polyvinyl chloride, polyimides, acrylic polymers, polystyrenes, celluloses, or polyvinylidene chloride. It is also possible to use copolymers of any compatible two or more of the monomers used to produce these polymers. Furthermore, compositions of the present invention may be included in adhesively formed laminates comprising paper substrates (such as polyester and polyolefin coated paperboards commonly encountered in food packaging). We especially prefer the polyesters.

Where there are two flexible polymer films, these may be the same as each other or they may be different from each other.

There is no particular restriction on the nature of the adhesive used, and any adhesive commonly used for the adhesion of two or more plastics films may be employed in the present invention. Examples of suitable adhesives include solvent-based (polyurethane) types such as those from Henkel (Liofol UR3969/UR 6055, Liofol UR3640/UR6800, Liofol UR3894/UR6055), Rohm & Haas (Adcote 811/9L10) and Coim (CA2525/2526), Solvent-free polyurethane adhesives such as Liofol 7780/UR6082, UR7750/UR6071 from Henkel, and Mor-Free ELM-415A/Mor-Free CR140 from Rohm & Haas, can also be used. As well as polyurethane adhesives, epoxy-based types such as Lamal 408-40A/C5083 may be used. Waterborne adhesives, such as Aqualam 300A/300D, an epoxy type from Rohm & Haas may also be used.

The adhesive may be applied directly to one of the films and then adhered to the gas barrier coating on the other film, or it may be applied to the gas barrier coating on one film and then adhered to the other film. In any case, the order of layers will be: a plastics film; the gas barrier coating; an adhesive; and another plastics film. If desired, layers of other materials may be interposed between any two of these layers, or on either side of the 2 flexible plastic substrates having the barrier coating between them.

The invention still further provides a method of preparing a gas barrier material comprising applying to a substrate a coating composition of the present invention, and removing the water.

The gas barrier films of the present invention may be used for packaging a variety of materials, especially foods, drinks and pharmaceuticals. In particular, they may be used for packaging liquids, e.g. as the flexible liquid-containing element of a bag-in-the-box package. However, their moisture resistance may also make them suitable for packaging solid or essentially solid materials where the packaging may come into contact with moisture.

The invention is further illustrated by the following non-limiting Examples.

EXAMPLES

The raw materials used to prepare these examples were;
1. A 7.1% (w/w) aqueous solution of polyviol P-6060, ex. Wacker, a silylated polyvinyl alcohol;
2. A 8.0% (w/w) solution of Exceval AQ-4104 in a 90/10 blend of water/IPA, a water soluble ethylene/vinyl alcohol copolymer;
3. Bindzil 15/500, ex. EKA. This anionic colloidal silica has a solids content of 15%, a specific surface area of 500 m²/g, a claimed particle size range of 3-5 nm, and a measured mean particle size of about 10 nm;
4. Bindzil 30/360, ex. EKA. This anionic colloidal silica has a solids content of 30%, a specific surface area of 360 m²/g, a claimed particle size range of 8-20 nm, and a mean particle size of about 20 nm;
5. Bindzil 40/220, ex. EKA. This anionic colloidal silica has a solids content of 40%, a specific area of 220 m²/g, a claimed particle size range of 7-25 nm, and a mean particle size of about 25 nm;
6. An 8.0% (w/w) solution of Exceval AQ-4104: Mowiol 4-98 (70:30 w/w) in a 95/5 blend water IPA.
7. Crystal L40, a lithium silicate solution, ex. Ineos silicas, containing 25% solids in water.

Various coating compositions were prepared by simple mixing of the ingredients. The formulations used are shown in Table 1

TABLE 1

Coating Examples C1-C7

| Example | Deionised Water | IPA | P-6060 Solution | AQ-4104 Solution | Bindzil 15/500 | Bindzil 30360 | Bindzil 40/220 |
|---|---|---|---|---|---|---|---|
| C1 | 29.1 | 4 | 5.6 | | 1.35 | | |
| C2 | 22.1 | 4 | 11.3 | | 2.6 | | |
| C3 | 15.1 | 4 | 16.9 | | 4.0 | | |
| C4 | 20.4 | 4 | 11.3 | | 4.3 | | |
| C5 | 23.3 | 4 | | 10 | 2.6 | | |
| C6 | 23.4 | 4 | 11.3 | | | 1.3 | |
| C7 | 23.7 | 4 | 11.3 | | | | 1.0 |

These coatings were applied at 4, 6 or 12 gsm wet applied film weight to the metallised surface of an Al-PET film comprising a coating of aluminium vacuum deposited (amount of Al deposited will vary from day to day on a 12 μm thick film of polyethylene terephthalate (PET). The coated film was then dried under a flow of warm air. Morchem 614A/614C adhesive was then applied to the coated surface and a laminate was formed by applying a sealing PE film to the adhesive. The laminates were allowed to cure at 25° C. for 7 days before being tested. The laminates were assessed for oxygen barrier ability, and the bond strengths were measured as a function of the time they were immersed in room temperature water. Table 2 provides the results of these tests. Bond Strengths in Table 2b are given as the force (N/15 mm) required to peel apart the PE layer from the coated metallised surface of the Al-PET after being immersed in water for varying times.

TABLE 2a

Examples 1-10: Evaluation of 2-ply A/B/C/D
2-ply laminates-Oxygen Barrier

| Example | Coating | Wet Film Weight | Dry Film Weight | OTR (23° C./50% RH) (cm³/m²/day) |
|---|---|---|---|---|
| 1 | none | — | — | 5.38 |
| 2 | C1 | 4 gsm | 0.06 gsm | — |
| 3 | C1 | 6 gsm | 0.09 gsm | 0.34 |
| 4 | C1 | 12 gsm | 0.18 gsm | 0.17 |
| 5 | C2 | 12 gsm | 0.36 gsm | <0.10 |
| 6 | C3 | 12 gsm | 0.54 gsm | 0.12 |
| 7 | C4 | 12 gsm | 0.65 gsm | — |
| 8 | C5 | 12 gsm | 0.36 gsm | 0.14 |
| 9 | C6 | 12 gsm | 0.36 gsm | 0.16 |
| 10 | C7 | 12 gsm | 0.36 gsm | — |

(A = Al-PET, B = Coating, C = adhesive, D = PE)

TABLE 2b

Examples 1-10: Evaluation of 2-ply laminates -
Wet Bond Strengths v. Immersion time

| Example | 0 mins | 30 mins | 60 mins | 120 mins | 180 mins | 240 mins | 420 mins |
|---|---|---|---|---|---|---|---|
| 1 | 2.8 (FT) | 1.5 (FT) | 1.7 | 0.4 | 0.2 | 0.1 | 0.1 |
| 2 | 2.2 (FT) | 0.2 | 0.2 | 0.1 | 0.1 | 0.1 | 0.1 |
| 3 | 2.1 (FT) | 0.6 | 0.3 | 0.1 | 0.1 | 0.1 | 0.1 |
| 4 | 2.8 (FT) | 2.2 (FT) | 2.2 | 0.9 | 0.8 | 0.6 | 0.4 |
| 5 | 2.3 (FT) | 2.4 (FT) | 2.8 (FT) | 1.4 | 0.8 | 0.8 | 0.9 |
| 6 | 2.0 (FT) | 1.4 (FT) | 1.3 (FT) | 1.9 (FT) | 1.7 | 1.5 | 1.2 |
| 7 | 4.0 (FT) | 2.2 (FT) | 2.3 (FT) | 2.2 (FT) | 1.9 (FT) | 1.1 | 1.1 |

TABLE 2b-continued

Examples 1-10: Evaluation of 2-ply laminates -
Wet Bond Strengths v. Immersion time

| Example | 0 mins | 30 mins | 60 mins | 120 mins | 180 mins | 240 mins | 420 mins |
|---|---|---|---|---|---|---|---|
| 8 | 3.7 (FT) | 1.9 (FT) | 2.3 (FT) | 1.8 (FT) | 1.7 (FT) | 1.3 | 1.1 |
| 9 | <0.5 | — | — | — | — | — | — |
| 10 | <0.5 | — | — | — | — | — | — |

It is clear from Table 2a that only Bindzil 15/500 provided any degree of bond strength in the laminate, even prior to immersion in water. Table 2a also indicates that these coatings can actually enhance the laminates resistance to water immersion.

TABLE 3

Coating Examples C11-C20; Used in the preparation of 3-ply laminates

| Coating | Deionised water | IPA | AQ4104-4-98 solution | Bindzil 15/500 | Lithium Silicate |
|---|---|---|---|---|---|
| C11 | 8 | 4 | 20 | 8.77 | |
| C12 | 5 | 4 | 30 | 5.58 | |
| C13 | 10 | 4 | 25 | 5.85 | |
| C14 | 13 | 4 | 15 | 13.15 | |
| C15 | 9 | | 30 | 5.85 | 2 |
| C16 | 9 | | 30 | 8.85 | 2 |
| C17 | 9.35 | | 30 | 5.85 | 1.65 |
| C18 | 9.75 | | 30 | 5.85 | 1.25 |
| C19 | 10 | | 30 | 5.85 | 1 |
| C20 | 10.5 | | 30 | 5.85 | 0.5 |

These coatings were applied at 12 gsm wet applied film weight to the metallised surface of the Al-PET and dried under a flow of warm air. Coim 2525/2526 adhesive was then applied to both surfaces of the coated Al-PET film and layers of sealing PE were applied to both surfaces. The laminates were allowed to cure at 25° C. for 7 days before being tested. The laminates were assessed for oxygen barrier ability, and the bond strengths were measured as a function of the time they were immersed in room temperature water. Table 4 provides the results of these tests. Bond Strengths in Table 2b are given as the force (N/15 mm) required to peel apart the PE layer from the coated metallised surface of the Al-PET after being immersed in water for varying times.

TABLE 4a

Examples 11-20: Evaluation of 3-ply D/C/A/B/C/D laminates-Oxygen Barrier

| Example | Coating | Wet film weight | OTR (23° C./50% RH) ($cm^3/m^2$/day) |
|---|---|---|---|
| 11 | C11 | 12 gsm | 0.3 |
| 12 | C12 | 12 gsm | 0.01 |
| 13 | C13 | 12 gsm | 0.2 |
| 14 | C14 | 12 gsm | 1.5 |
| 15 | C15 | 12 gsm | 0.01 |
| 16 | C16 | 12 gsm | 0.01 |
| 17 | C17 | 12 gsm | 0.2 |
| 18 | C18 | 12 gsm | 0.1 |
| 19 | C19 | 12 gsm | 0.01 |
| 20 | C20 | 12 gsm | 0.2 |

(A = Al-PET, B = Coating, C = adhesive, D = PE)

TABLE 4b

Examples 11-20: Evaluation of 3-ply laminates
Wet Bond Strengths v. Immersion time

| Example | 0 | 30 | 60 | 120 | 180 | 240 | 300 |
|---|---|---|---|---|---|---|---|
| Control | 2.8 (FT) | 1.5 (FT) | 1.7 | 0.4 | 0.2 | 0.1 | 0.1 |
| 11 | 3.2 (F.T) | 3.0 | 3.0 | 1.2 | 0.8 | 0.9 | 0.5 |
| 12 | 3.5 (F.T) | 3.0 (F.T) | 2.0 | 1.5 | 1.0 | 1.0 | 1.0 |
| 13 | 3.4 (F.T) | 2.9 | 3.1 | 3.0 | 1.2 | 0.9 | 0.8 |
| 14 | 3.5 (F.T) | 3.5 (F.T) | 2.8 | 2.5 | 1.8 | 1.9 | 1.8 |
| 15 | 4 (F.T) | 4 (F.T) | 4 (F.T) | 3 | 3 | 2.5 | 1.5 |
| 16 | 4.5 (F.T) | 4.2 | 3.8 | 3.5 | 2.75 | 2.5 | 1.0 |
| 17 | 3.5 (F.T) | 3.3 (F.T) | 3.0 | 3.0 | 2.7 | 2.5 | 2.5 |
| 18 | 3.3 (F.T) | 3.2 (F.T) | 3.2 (F.T) | 3.4 (F.T) | 2.3 | 2.2 | 1.6 |
| 19 | 3.0 | 3.1 | 3.1 | 3 | 2.5 | 1.8 | 1.4 |
| 20 | 2.8 | 3 | 2.8 | 3.0 | 2.0 | 1.9 | 1.0 |

The invention claimed is:

1. A gas barrier coating composition consisting essentially of:
   a) an aqueous solution or dispersion of a polyvinyl alcohol (PVOH), and/or an ethylene-vinyl alcohol copolymer (EVOH);
   b) a colloidal silica, in which said silica has a specific surface area greater than 300 $m^2$/g; and
   c) an alkali metal silicate.

2. A composition according to claim 1, in which the colloidal silica has a particle size of less than 20 nm.

3. A composition according to claim 1, in which the colloidal silica has a particle size of less than 10 nm.

4. A composition according to claim 1, in which said silica has a specific surface area of greater than 400 $m^2$/g.

5. A composition according to claim 4, in which said silica has a specific surface area of greater than 450 $m^2$/g.

6. A composition according to claim 4, in which said alkali metal silicate is lithium silicate.

7. A method of preparing a gas barrier material comprising applying to a substrate a coating composition according to claim 1, and removing the water.

8. A gas barrier material prepared by a method according to claim 7.

9. A material according to claim 8, additionally comprising a flexible plastics material laminated to the coated side of the substrate.

10. A material according to claim 9, in the form of a liquid container.

11. A bag-in-the-box container having a bag comprising a material according to claim 8.

12. A composition according to claim 4, in which the colloidal silica has a particle size less than 20 nm.

13. A composition according to claim 12, in which said alkali metal silicate is lithium silicate.

14. A composition according to claim 1, in which said alkali metal silicate is lithium silicate.

15. A gas barrier material comprising a composition according to claim 1 from which the water has been removed.

16. A gas barrier material comprising a composition according to claim 13 from which the water has been removed.

17. A composition according to claim 1, wherein an amount of the alkali metal silicate is in the range of 2-25% (w/w) based on the total solids content of the composition.

\* \* \* \* \*